(12) United States Patent
Dorca et al.

(10) Patent No.: US 9,193,374 B2
(45) Date of Patent: Nov. 24, 2015

(54) REVERSING STRUCTURE FOR BACKREST OF PRAM

(76) Inventors: Jordi Dorca, Sabadell (ES); Yiheng Liu, Dongguan (CN)

(*) Notice: Subject to any disclaimer, the term of this patent is extended or adjusted under 35 U.S.C. 154(b) by 55 days.

(21) Appl. No.: 13/976,828

(22) PCT Filed: Dec. 28, 2011

(86) PCT No.: PCT/CN2011/084797
§ 371 (c)(1),
(2), (4) Date: Jul. 24, 2013

(87) PCT Pub. No.: WO2012/089119
PCT Pub. Date: Jul. 5, 2012

(65) Prior Publication Data
US 2013/0328356 A1    Dec. 12, 2013

(30) Foreign Application Priority Data

Dec. 29, 2010  (CN) .......................... 2010 1 0610284
Dec. 29, 2010  (CN) .......................... 2010 2 0685449

(51) Int. Cl.
*B62B 7/00* (2006.01)
*B62B 9/10* (2006.01)

(52) U.S. Cl.
CPC ................. *B62B 9/102* (2013.01); *B62B 9/104* (2013.01)

(58) Field of Classification Search
CPC ............ B62B 7/00; B62B 9/102; B62B 3/02; B62B 9/104
USPC ............... 280/642, 650, 658, 647, 47.38, 651
See application file for complete search history.

(56) References Cited

U.S. PATENT DOCUMENTS 4,479,665 A    10/1984  Kassai
6,086,087 A *   7/2000  Yang ............................ 280/658

(Continued)

FOREIGN PATENT DOCUMENTS

CN    2393775 Y    8/2000
CN    2758147 Y    2/2006

(Continued)

OTHER PUBLICATIONS

Li, Qing, International Search Report for International Patent Application No. PCT/CN2011/084797, Apr. 12, 2012, 2 pages.

*Primary Examiner* — Hau Phan
(74) *Attorney, Agent, or Firm* — Sutherland Asbill & Brennan LLP

(57) ABSTRACT

Disclosed is a reversing structure for the backrest of a pram. The front ends of seat carrier bend pipes (20) of a backrest mechanism (2) arranged in the middle part of a pram frame (1) are respectively connected to front foot tubes (10) of the pram frame (1), with the rear ends of the seat carrier bend pipes (20) respectively connected to the lower ends of rear foot pipes (11) of the pram frame (1), and with the rear ends of seat carrier straight pipes (21) respectively connected to the upper ends of the rear foot pipes (11) via sliding sleeves (12) so that they are able to slide. The front ends of the seat carrier straight pipes (21) are respectively connected to segmented pieces (22) fixed to the seat carrier bend pipes (20); segmented snap grooves (221) are arranged on the inner side of the segmented pieces (22); backrest pipes (24) are connected to the side corresponding to the segmented snap grooves (221) via snap screws (23); the backrest pipes (24) are fastened to a backrest plate (26) via supporting pieces (25); and backrest tension lines (27) are threaded through the backrest pipes (24). An in-pipe sliding sleeve (28) is connected to the end of the backrest tension line (27) corresponding to the segmented piece (22) via a tension line shank head (271); the in-pipe sliding sleeve (28) is connected to the backrest pipe (24) via a segmented pin (281) so that it is able to slide; the other end of the backrest tension line (27) is connected to a backrest tension shank (29), and the backrest tension shank (29) is elastically connected to the backrest plate (26). The structure thereof can achieve easy reversing of the backrest part of a pram, resulting in more interactivity between parents and a baby, helping to promote intimacy between parent and baby.

16 Claims, 5 Drawing Sheets

(56) References Cited

U.S. PATENT DOCUMENTS

| | | | |
|---|---|---|---|
| 6,322,097 B1 * | 11/2001 | Lan | 280/642 |
| 6,530,591 B2 * | 3/2003 | Huang | 280/650 |
| 6,880,850 B2 * | 4/2005 | Hsia | 280/642 |
| 7,832,744 B2 * | 11/2010 | Chen et al. | 280/47.4 |
| 8,366,127 B2 * | 2/2013 | Zhong et al. | 280/47.4 |
| 8,550,479 B2 * | 10/2013 | Yi et al. | 280/47.38 |
| 2003/0030252 A1 | 2/2003 | Huang | |
| 2003/0132611 A1 * | 7/2003 | Yoshie et al. | 280/642 |
| 2004/0245747 A1 * | 12/2004 | Hsia | 280/642 |
| 2005/0242547 A1 * | 11/2005 | Chen | 280/642 |
| 2009/0039620 A1 * | 2/2009 | Ryan et al. | 280/647 |
| 2011/0068549 A1 * | 3/2011 | Chen | 280/47.38 |
| 2011/0148168 A1 * | 6/2011 | Chen | 297/364 |

FOREIGN PATENT DOCUMENTS

| | | |
|---|---|---|
| CN | 100410121 C | 8/2008 |
| CN | 102060046 A | 5/2011 |
| CN | 201907548 U | 7/2011 |
| EP | 2178735 B1 | 5/2011 |
| FR | 2798349 A1 | 3/2001 |
| WO | WO 02/20330 | 3/2002 |

* cited by examiner

REVERSING STRUCTURE FOR BACKREST OF PRAM

TECHNICAL FIELD

The utility model is related to the field of toddler articles, in particular to an easily operated reversing structure for baby carriage back mechanism.

BACKGROUND TECHNOLOGY

At present, various baby carriages provide convenience for people to take children out. However, baby carriages as we know have seat facing the front. Although children can have a good view of surrounding scenery, which makes children joyful to some extent, it brings about difficulty in communication between parents and children and due to lack of interaction.

CONTENTS OF INVENTION

In order to solve above problem, the utility module provides a back reversing structure that can easily reverse the back and enhance interaction between the user and the baby in the carriage.

In order to realize above goal, the utility model adopts the following technical proposal: The front end of the seat frame elbow of the back mechanism that is arranged at the center of the carriage frame is connected to the front foot tube of the carriage frame. The back end of the seat frame elbow is connected to the lower end of the back foot tube of the carriage frame. The back end of the straight tube of the seat frame is connected to the upper end of the back foot tube via the sliding sleeve. The front end of the straight tube of the seat frame is connected to the segmenting chip on the seat frame elbow. The segmenting chip is provided with a segmenting slot on the internal side. The side corresponding to the segmenting slot is connected with a back tube via a clip. The back tube is fixed on the back board via the supporting chip. A back stay goes through the back tube. An end of the segmenting chip corresponding to the stay is connected with an internal sliding sleeve via the stay handle. The internal sliding sleeve is connected to the back tube via the segmenting pin. The other end of the back stay is connected with the back handle. The back handle is connected with the back board elastically.

The segmenting slot of the segmenting chip is arc shaped. The segmenting slot divides the lower arc plane into a front slot and a back slot via the transitional section. The arc of the front slot is longer than the back slot. Both the front slot and the back slot are provided with more than two posts which are distributed radioactively.

The segmenting pin of the internal sliding sleeve extrudes the sliding holes on both sides of the back tube. The plug-in end of the segmenting pin corresponding to the end of the segmenting slot stretches to the segmenting slot of the segmenting chip. The diameter of the segmenting pin is fitted with the width of the post of the segmenting slot. The segmenting spring in the back tube is plugged between the clip of the back tube and the internal sliding sleeve. The back tube is in the shape of letter Z.

The stay handle of the back stay is plugged in the internal casing. The back stay goes through the hole on the stay handle and is connected to the segmenting pin of the internal casing.

The upper end of the back board is provided with a handle hole. The back handle on the back board and the corresponding end of the handle hole are provided with a U-shaped handle sleeve which is provided with a connecting board in the middle. The length of the connecting board is larger than the width of the handle hole. The length of the connecting board is fitted with the width of the upper end of the back board.

The connecting board is provided with a slide opening in the middle. The back board at corresponding position of the slide opening is provided with a slide opening bulge and they are fitted with each other. Both ends of the connecting board are connected with the back stay via the line pore. An elastic key opening is arranged between the slide opening and the line pore. The spring in the elastic key opening is fitted with the convex key corresponding to the upper end of the back board via the fixing block on the bottom and is plugged in the elastic key opening.

The utility model has the following beneficial effects: The back of the baby carriage is easily reversed through interaction between the segmenting pin on the slide sleeve in the tube and the post of the segmenting chip, together with linkage between the back stay and the back handle, creating conditions for exchange between children and parents, enhancing interaction and relation between parents and children.

EXPLANATION OF MARKS IN DRAWINGS

1. Carriage frame; 10. Front foot tube; 11. Back foot tube; 12. Slide sleeve;
2. Back mechanism; 21. Seat frame straight tube; 20. Seat frame elbow; 22. Segmenting chip;
221. Segmenting slot; 222. Transitional section; 223. Front slot; 224. Back slot;
225. Post; 23. Clip; 224. Back tube; 241. Sliding hole;
242. Segmentation; 25. Supporting chip; 26. Back board; 261. Handle hole;
271. Stay handle; 28. Internal slide sleeve; 281. Segmenting pin; 29. Back handle;
291. U-shaped handle sleeve; 292. Connection board; 293. Slide opening; 294. Line pore;
295. Elastic key opening; 296. Fixing block.

DESCRIPTION OF PREFERRED EMBODIMENTS

Figure 1:
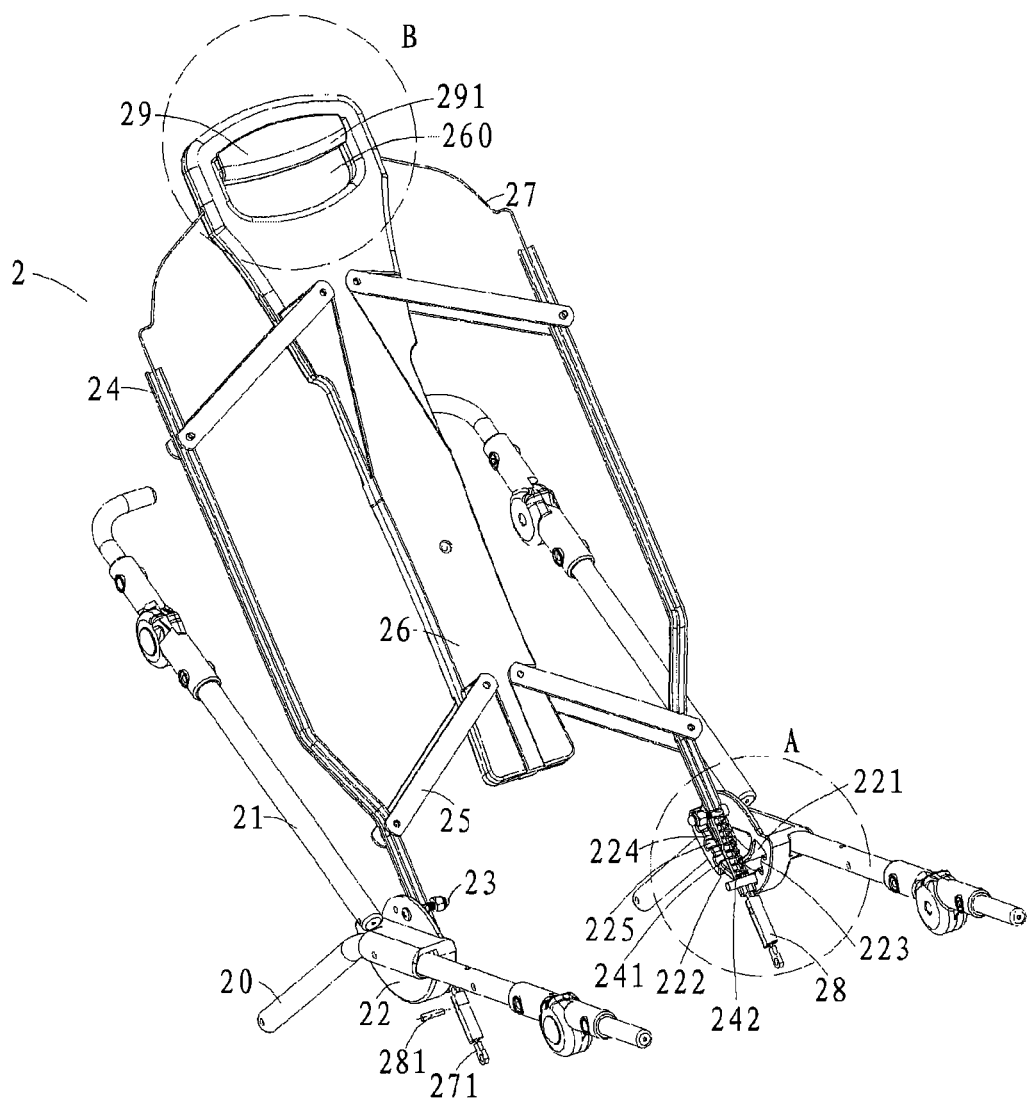
FIG. 1 is the 3D assembly structural diagram.
Figure 2:
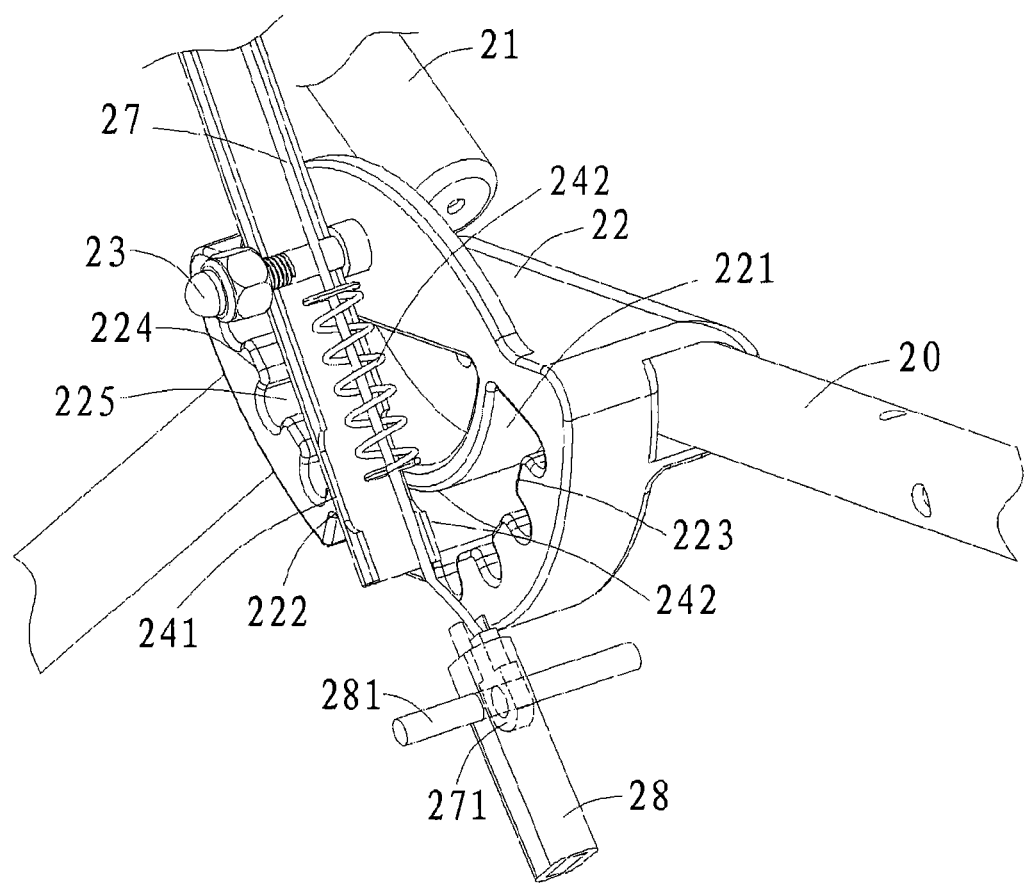
FIG. 2 is the zoom-in ASSEMBLY diagram of Part A in FIG. 1.
Figure 3:
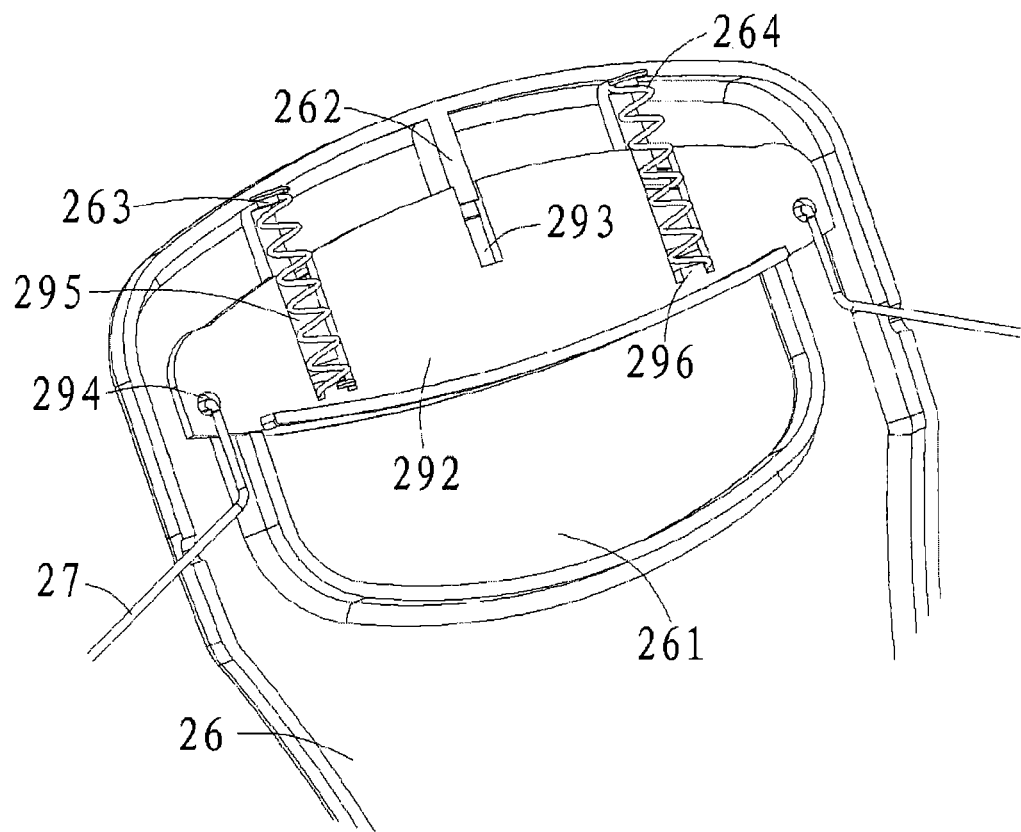
FIG. 3 is the zoom-in internal structure diagram of Part B in FIG. 1.
Figure 4:
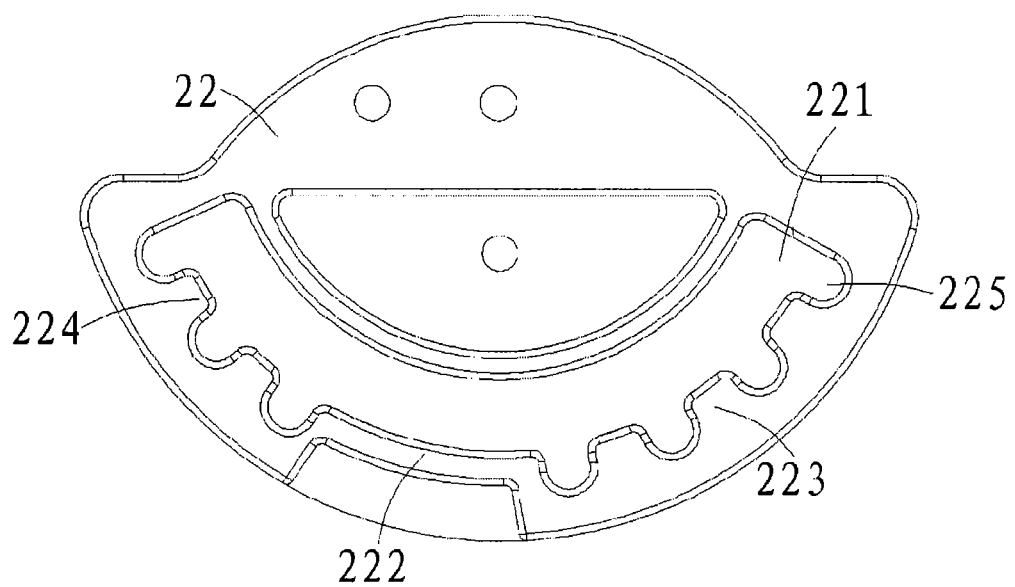
FIG. 4 is the side view of the segmenting chip of the utility model.
Figure 5:
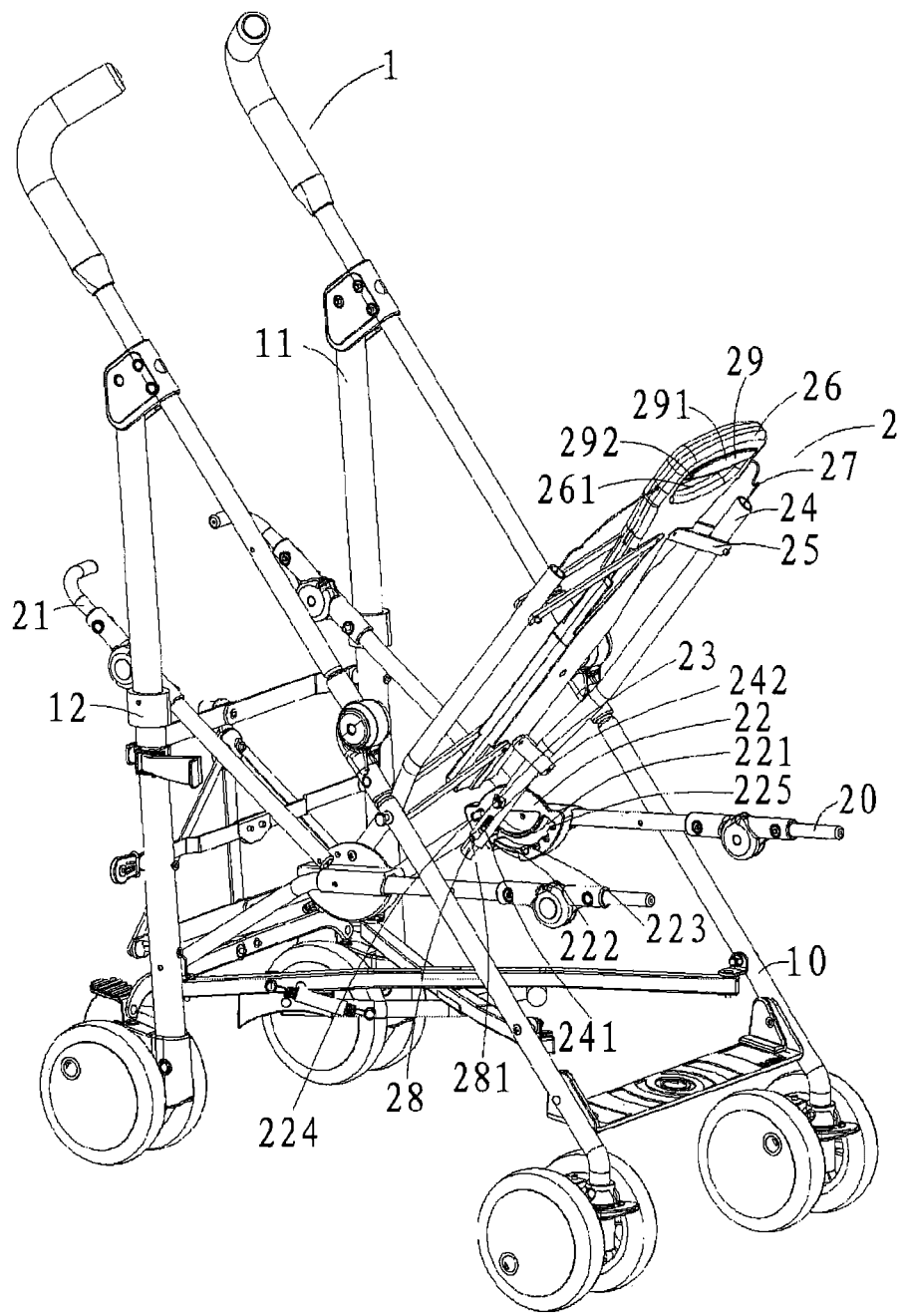
FIG. 5 is the structural diagram of the utility model used for carriage frame in reversed state.

Referring to FIGS. 1 to 5, the utility model discloses a reversing structure for baby carriage back mechanism, the front end of the seat frame elbow (20) of the back mechanism (2) that is arranged at the center of the carriage frame (1) is connected to the front foot tube (10) of the carriage frame (1), the back end of the seat frame elbow (20) is connected to the lower end of the back foot tube (11) of the carriage frame (1), the back end of the straight tube of the seat frame (21) of the back mechanism (2) is connected to the upper end of the back foot tube (11) via the sliding sleeve (12), the front end of the straight tube of the seat frame (21) is connected to the segmenting chip (22) on the seat frame elbow (20). The utility model is characterized in that: The segmenting chip (22) is provided with a segmenting slot (221) on the internal side, the segmenting slot (221) of the segmenting chip (22) is arc shaped, the segmenting slot (221) divides the lower arc plane into a front slot (223) and a back slot (224) via the transitional section (222), the arc of the front slot (223) is longer than the back slot (224), both the front slot (223) and the back slot (224) are provided with more than two posts (225) which are distributed radioactively, the side corresponding to the segmenting slot (221) is connected with a back tube (24) via a clip (23), the back tube (24) is fixed on the back board (26) via the supporting chip (25), a back stay (27) goes through the back tube (24), an end of the segmenting chip (22) corresponding to the stay (27) is connected with an internal sliding sleeve (28) via the stay handle (271), the internal sliding sleeve (28) is connected to the back tube (24) via the segmenting pin (281), the other end of the back stay (27) is connected with the back handle (29), the back handle (29) is connected with the back board (26) elastically, the segmenting pin (281) of the internal sliding sleeve (28) extrudes the sliding holes (241) on both sides of the back tube (24), the plug-in end of the segmenting pin (281) corresponding to the end of the segmenting slot (221) stretches to the segmenting slot (221) of the segmenting chip (22), the diameter of the segmenting pin (281) is fitted with the width of the post (225) of the segmenting slot (221), the segmenting spring (242) in the back tube (24) is plugged between the clip of the back tube (24) and the internal sliding sleeve, the back tube (24) is in the shape of letter Z.

The reversing structure for baby carriage back mechanism disclosed in the utility model is characterized in that: The stay handle (271) of the back stay (27) is plugged in the internal casing. The back stay (27) goes through the hole on the stay handle (271) and is connected to the segmenting pin (281) of the internal casing.

The reversing structure for baby carriage back mechanism disclosed in the utility model is characterized in that: The upper end of the back board (26) is provided with a handle hole (261). The back handle (29) on the back board (26) and the corresponding end of the handle hole (261) are provided with a U-shaped handle sleeve (291) which is provided with a connecting board (292) in the middle. The length of the connecting board (292) is larger than the width of the handle hole (261). The length of the connecting board (292) is fitted with the width of the upper end of the back board (26).

The reversing structure for baby carriage back mechanism disclosed in the utility model is characterized in that: The connecting board (292) is provided with a slide opening (293) in the middle. The back board (26) at corresponding position of the slide opening (293) is provided with a slide opening bulge (262) and they are fitted with each other. Both ends of the connecting board (292) are connected with the back stay (27) via the line pore (294). An elastic key opening (295) is arranged between the slide opening (293) and the line pore (294). The spring (264) in the elastic key opening (295) is fitted with the convex key (263) corresponding to the upper end of the back board (26) via the fixing block (296) on the bottom and is plugged in the elastic key opening (295).

Above implementation is only description of the optimal way of the utility model rather than limitation of scope of the utility model. Under the precondition of not deviating from design spirit of the utility model, various deformations and improvements made by ordinary technicians within the field shall be within the scope of protection determined in the Claim of the utility model.

The invention claimed is:

1. A reversing structure for a backrest of a baby carriage, the reversing structure comprising:
a carriage frame comprising a front foot tube connected to a back foot tube; and
a back mechanism arranged at a center of the carriage frame, wherein the back mechanism is capable of reversing the backrest for supporting a child in either a forward facing or rearward facing position, comprising
a front end of a seat frame elbow connected to the front foot tube;
a back end of the seat frame elbow connected to the lower end of the back foot tube; and
a segmented piece directly connected to the seat frame elbow; and
a back end of a straight tube of a seat frame connected to an upper end of the back foot tube via a sliding sleeve and a front end of the straight tube connected to the segmented piece.

2. The reversing structure according to claim 1, comprising
a segmenting slot on an internal side of the segmented piece;
a back tube connected to the internal side;
a back rest connected to the hack tube;
a back rest tension line through the back tube connecting a back handle to an internal sliding sleeve; and
wherein the internal sliding sleeve is connected to the back tube via a detachable segmenting pin; and
the back handle is elastically connected with the back rest.

3. The reversing structure according to claim 2, wherein the segmenting slot is arc shaped, the segmenting slot comprises a front slot and a back slot separated by a transitional section, an arc of the front slot is longer than an arc of the back slot; and both the front slot and the back slot comprise more than two radially-distributed posts.

4. The reversing structure according to claim 2, comprising
a detachable segmenting pin connected to the internal sliding sleeve, wherein the detachable segmenting pin protrudes through sliding holes on both sides of the back tube;
a diameter of the detachable segmenting pin is fitted within a width of the post of the segmenting slot; and
a segmenting spring within the back tube secured between a clip of the back tube and the internal sliding sleeve, wherein the back tube is in the shape of letter Z.

5. The reversing structure according to claim 4, wherein the back handle is secured in an internal casing and
the back rest tension line is secured in a hole on the back handle and the back rest tension line is connected to the detachable segmenting pin.

6. The reversing structure according to claim 2, wherein an upper end of the back rest comprises a handle hole;
a length of a connecting board accessible through the handle hole is larger than the width of the handle hole; and
the length of the connecting board is fitted within the width of the upper end of the back rest.

7. The reversing structure according to claim 6, wherein;
the connecting board comprises a slide opening in the middle; and
the back rest comprises a slide opening bulge and the slide opening and the slide opening bulge are fitted with each other.

8. A baby carriage, comprising:
a front foot tube;
a back foot tube;
a seat frame elbow connected to the from foot tube and connected to the back foot tube, wherein the seat frame elbow comprises a bend located between the front foot tube and the back foot tube;

a segmented piece comprising a segmented snap groove, wherein the segmented piece is directly connected to the seat frame elbow between the bend and the front foot tube; and a seat carrier straight tube connected to the segmented piece and connected to the back foot tube via a sliding sleeve above where the seat frame elbow is connected to the back foot tube.

9. The baby carriage of claim 8, wherein the seat carrier straight tube extends behind the back foot tube.

10. The baby carriage of claim 9, wherein the seat carrier straight tube is connected to an upper end of the back foot tube via the sliding sleeve.

11. The baby carriage of claim 10, wherein a front end of the seat carrier straight tube is connected to the segmented piece.

12. The baby carriage of claim 8, wherein the seat frame elbow is connected to the to a lower end the back foot tube.

13. The baby carriage of claim 8, wherein the segmented piece comprises a segmenting slot on an internal side of the segmented piece.

14. The baby carriage of claim 8, comprising a back mechanism, wherein the back mechanism comprises a back rest and a segmenting pin capable of being received within the snap groove such that the back rest is capable of reversing to support a child in either a forward facing or rearward facing position.

15. A reversing structure for a backrest of a baby carriage, the reversing structure comprising:
    a carriage frame comprising a front foot tube connected to a back foot tube; and
    a back mechanism arranged at a center of the carriage frame, comprising a front end of a seat frame elbow connected to the front foot tube;
    a back end of the seat frame elbow connected to the lower end of the back foot tube; and
    a segmented piece connected to the seat frame elbow;
    a back end of a straight tube of a seat frame connected to an upper end of the back foot tube via a sliding sleeve and a front end of the straight tube connected to the segmented piece;
    a segmenting slot on an internal side of the segmented piece;
    a back tube connected to the internal side;
    a back rest connected to the back tube;
    a back rest tension line through the back tube connecting a back handle to an internal sliding sleeve, wherein the internal sliding sleeve is connected to the back tube via a detachable segmenting pin and the back handle is elastically connected to the back rest;
    a detachable segmenting pin connected to the internal sliding sleeve, wherein the detachable segmenting pin protrudes through sliding holes on both sides of the back tube;
    a diameter of the detachable segmenting pin is fitted within a width of the post of the segmenting slot; and
    a segmenting spring within the back tube secured between a clip of the back tube and the internal sliding sleeve, wherein the back tube is in the shape of letter Z.

16. The reversing structure according to claim 15, wherein the back handle is secured in an internal casing and the back rest tension line is secured in a hole on the back handle and the back rest tension line is connected to the detachable segmenting pin.

* * * * *